United States Patent
Yang et al.

(10) Patent No.: US 12,430,425 B2
(45) Date of Patent: Sep. 30, 2025

(54) CONTINUES INTEGRATION AND CONTINUES DEPLOYMENT PIPELINE SECURITY

(71) Applicant: International Business Machines Corporation, Armonk, NY (US)

(72) Inventors: Bo Yang, Beijing (CN); HongLei Guo, Beijing (CN); Zhili Guo, Beijing (CN); Anca Sailer, Scarsdale, NY (US); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 17/168,228

(22) Filed: Feb. 5, 2021

(65) Prior Publication Data

US 2022/0253522 A1    Aug. 11, 2022

(51) Int. Cl.
  *G06F 21/55*  (2013.01)
  *G06N 5/04*  (2023.01)
  *G06N 20/00*  (2019.01)

(52) U.S. Cl.
  CPC ............. *G06F 21/554* (2013.01); *G06N 5/04* (2013.01); *G06N 20/00* (2019.01); *G06F 2221/034* (2013.01)

(58) Field of Classification Search
  CPC . G06F 21/554; G06F 2221/034; G06N 20/00; G06N 5/04; G06Q 10/06398
  See application file for complete search history.

(56) References Cited

U.S. PATENT DOCUMENTS

| | | | |
|---|---|---|---|
| 10,073,974 B2* | 9/2018 | Hwang | G06F 8/71 |
| 10,310,969 B2 | 6/2019 | Bhattacharjee | |
| 10,353,801 B2* | 7/2019 | Carey | G06F 11/362 |
| 10,437,585 B2 | 10/2019 | Mills | |
| 10,642,675 B2* | 5/2020 | Williamson | G06F 11/366 |
| 11,144,289 B1* | 10/2021 | Hwang | G06F 8/72 |
| 2018/0293386 A1 | 10/2018 | Barouni Ebrahimi | |
| 2019/0004891 A1* | 1/2019 | Bi | G06F 11/0793 |
| 2019/0138288 A1* | 5/2019 | Brealey | G06F 11/3688 |
| 2019/0235846 A1* | 8/2019 | Janjua | G06Q 10/067 |
| 2019/0235847 A1* | 8/2019 | Nguyen | G06F 11/36 |
| 2019/0317754 A1 | 10/2019 | Mosquera | |
| 2020/0401397 A1* | 12/2020 | Thomas | G06F 11/327 |
| 2021/0019249 A1* | 1/2021 | Gnaneswaran | G06N 20/20 |
| 2021/0037353 A1* | 2/2021 | Locascio | H04L 67/02 |
| 2021/0125087 A1* | 4/2021 | Mor | G06F 18/2148 |
| 2021/0142159 A1* | 5/2021 | Gupta | G06N 3/044 |
| 2021/0182387 A1* | 6/2021 | Zhu | G06N 7/01 |
| 2021/0241088 A1* | 8/2021 | Fong | G06N 20/00 |

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

*Primary Examiner* — Abu S Sholeman
(74) *Attorney, Agent, or Firm* — CHIP LAW GROUP

(57) ABSTRACT

A computer-implemented method for Continues Integration and Continues Deployment (CICD) pipeline security check is provided according to embodiments of the present disclosure. In the method, a plurality of events is executed sequentially to create a CICD pipeline. The plurality of events is monitored. Moreover, a security status of the CICD pipeline is determined based on the monitored events and a model for predicting the security status of the CICD pipeline.

18 Claims, 9 Drawing Sheets

CONTINUES INTEGRATION AND CONTINUES DEPLOYMENT PIPELINE SECURITY

BACKGROUND

The present disclosure relates to software security, and more specifically, to Continues Integration and Continues Deployment (referred to as CICD) pipeline security.

With a rapid pace of agile software development, more codes need to be written while more releases need to be made. This may introduce more unknown dependencies and vulnerabilities at each developing step, thereby leading to security problems. Generally, manual security processes rely on human experiences, such as, human operational knowledge and trust. The human experiences cannot be scaled to meet needs of enterprises with automated build and release infrastructure.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one embodiment of the present disclosure, there is provided a computer-implemented method for CICD pipeline security check. In the method, a plurality of events may be executed sequentially to create a CICD pipeline. The plurality of events may be monitored. Moreover, a security status of the CICD pipeline may be determined based on the monitored events and a model for predicting the security status of the CICD pipeline.

According to an embodiment of the present disclosure, there is provided an apparatus for CICD pipeline security check. The apparatus may comprise one or more processing units, a memory coupled to at least one of the processing units, and a set of computer program instructions stored in the memory. The set of computer program instructions may be executed by at least one of the processing units to perform the above method.

According to an embodiment of the present disclosure, there is provided a computer program product for CICD pipeline security check. The computer program product may comprise a computer readable storage medium having program instructions embodied therewith. The program instructions executable by a processor causes the processor to perform the above method.

In addition to the exemplary aspects and embodiments described above, further aspects and embodiments will become apparent by reference to the drawings and by study of the following descriptions.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
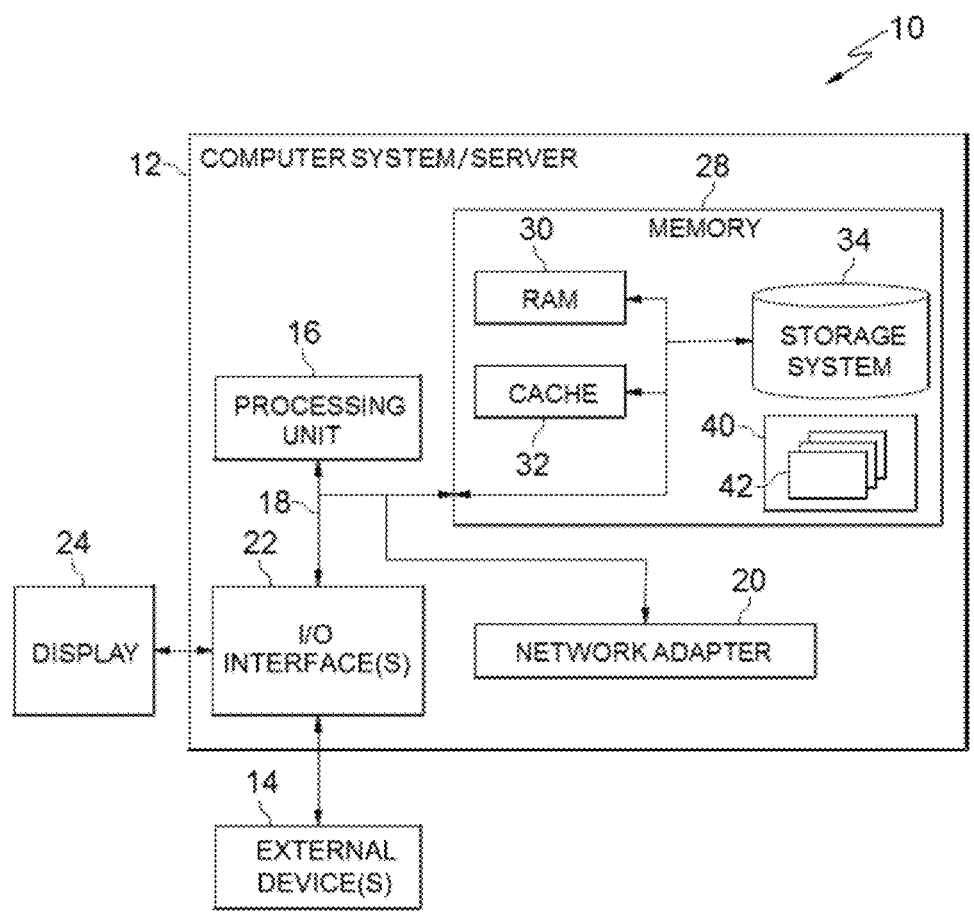
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
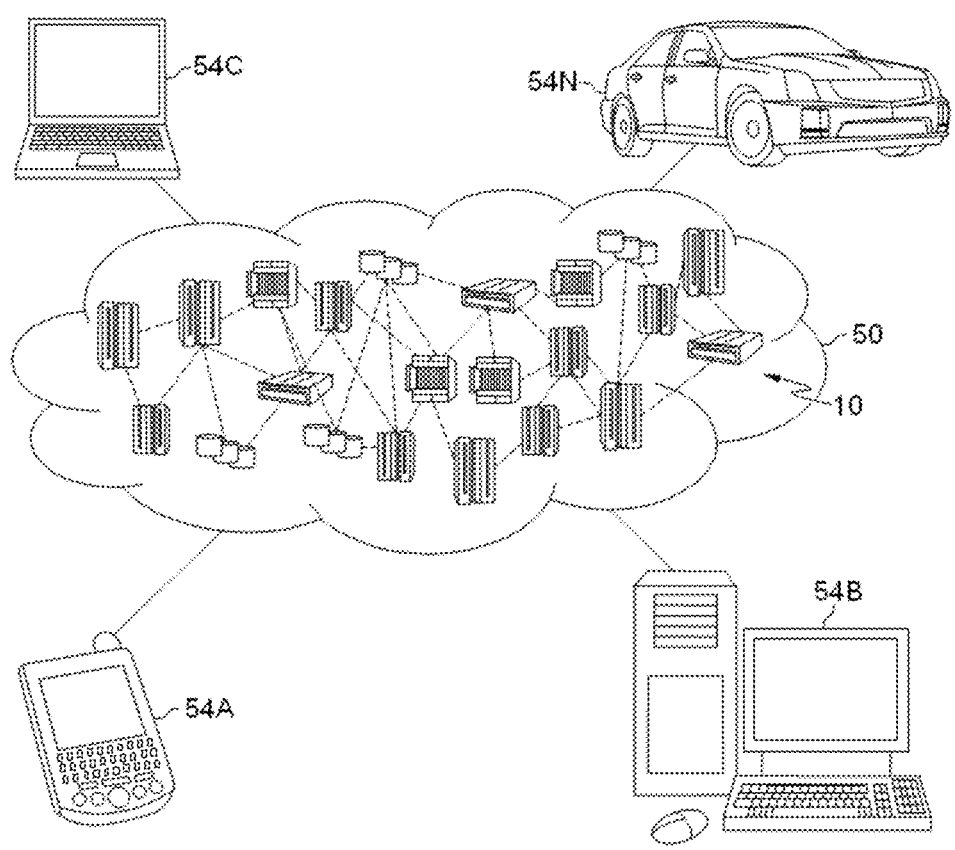
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
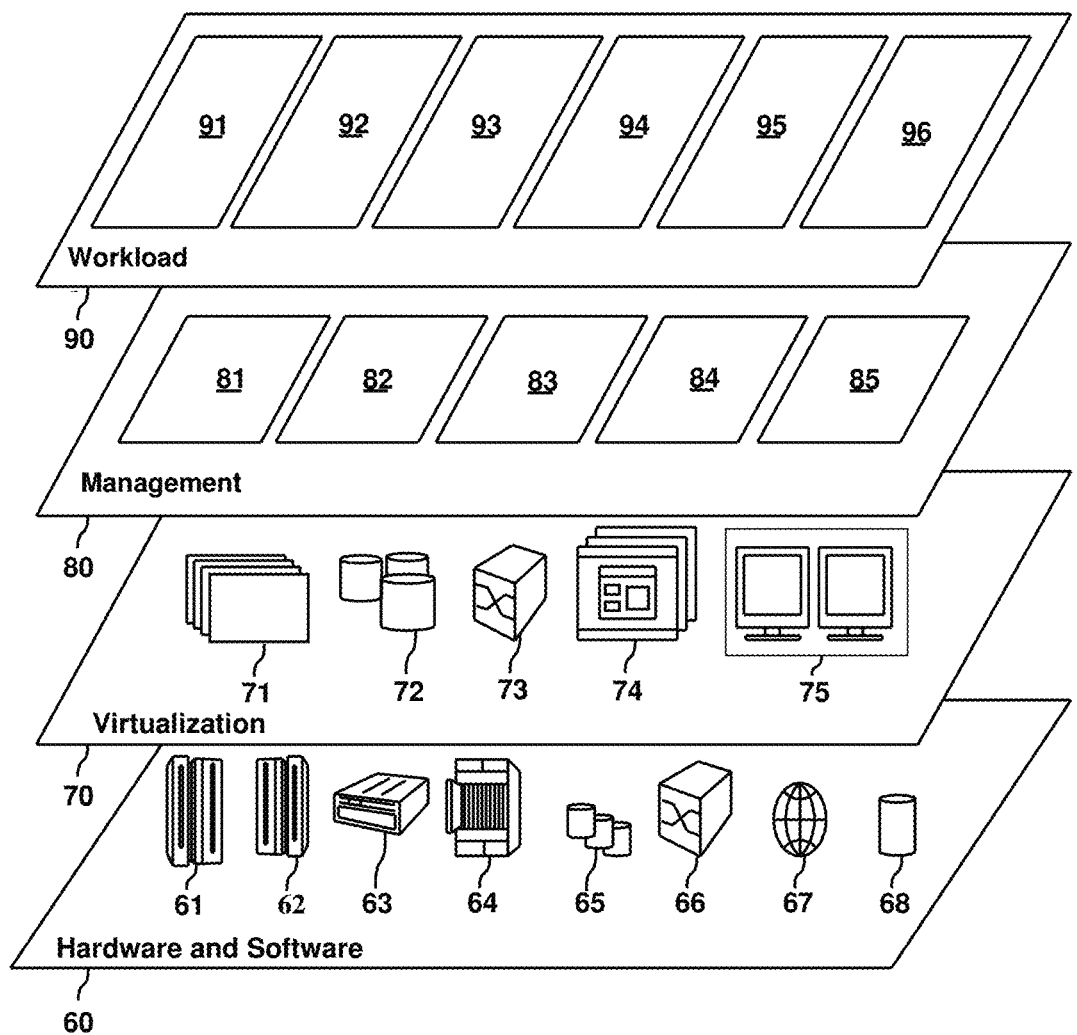
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and CICD pipeline security check 96.

A Continues Integration and Continues Deployment pipeline, also referred to as a CICD pipeline, manages a faster and more dynamic software delivery cycle across hybrid cloud environments with different configurations. Therefore, the CICD pipeline requires deeper compliance and greater control. There is a need to implement a securing approach that covers not just runtime security but also CICD pipeline security.

Embodiments of the present disclosure provide a method for securing a CICD pipeline based on a model for predicting the security status of the CICD pipeline. The model can be trained based on historical data according to embodiments of the present disclosure.

Figure 4:
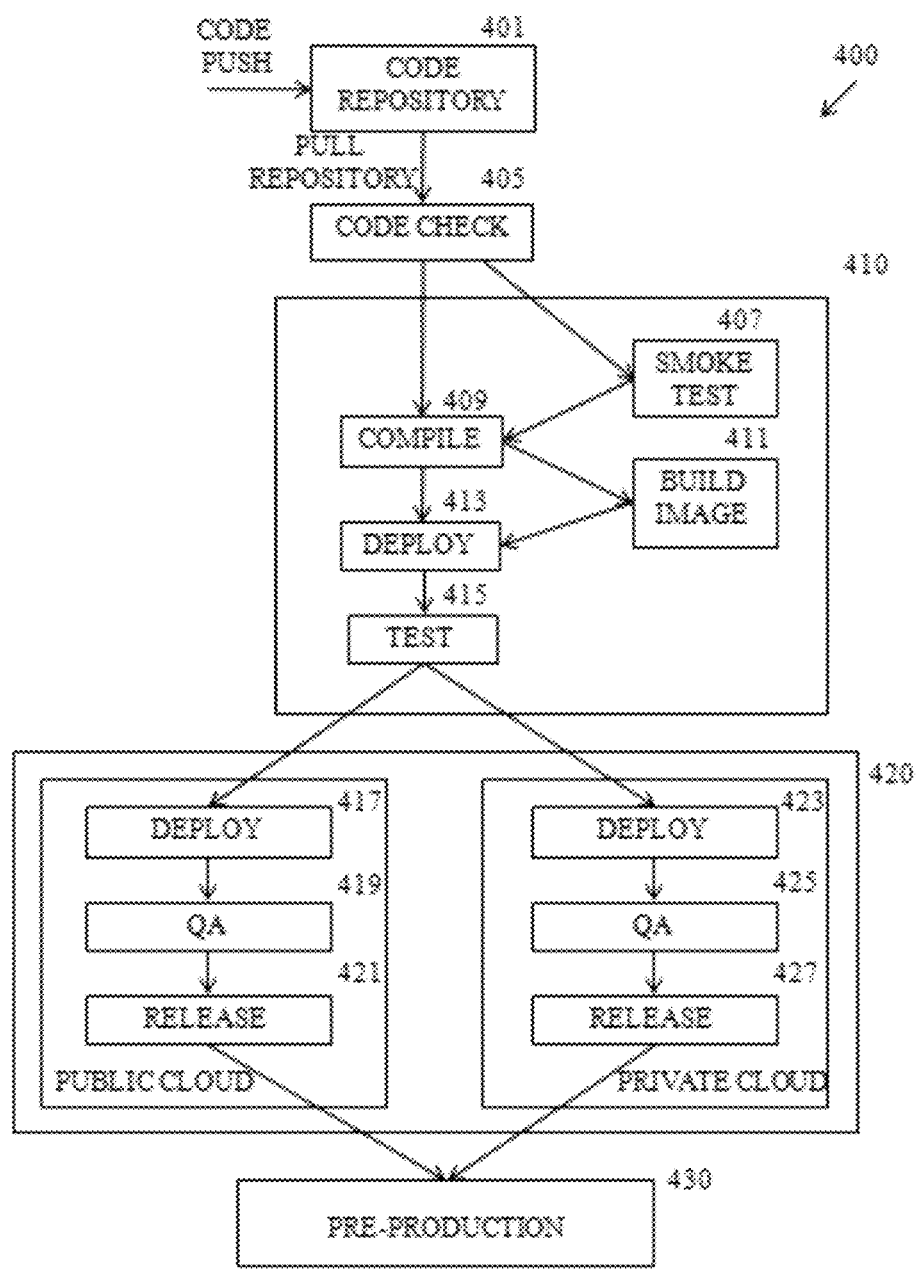
FIG. 4 depicts a schematic flowchart of an exemplary CICD pipeline.
Figure 5:
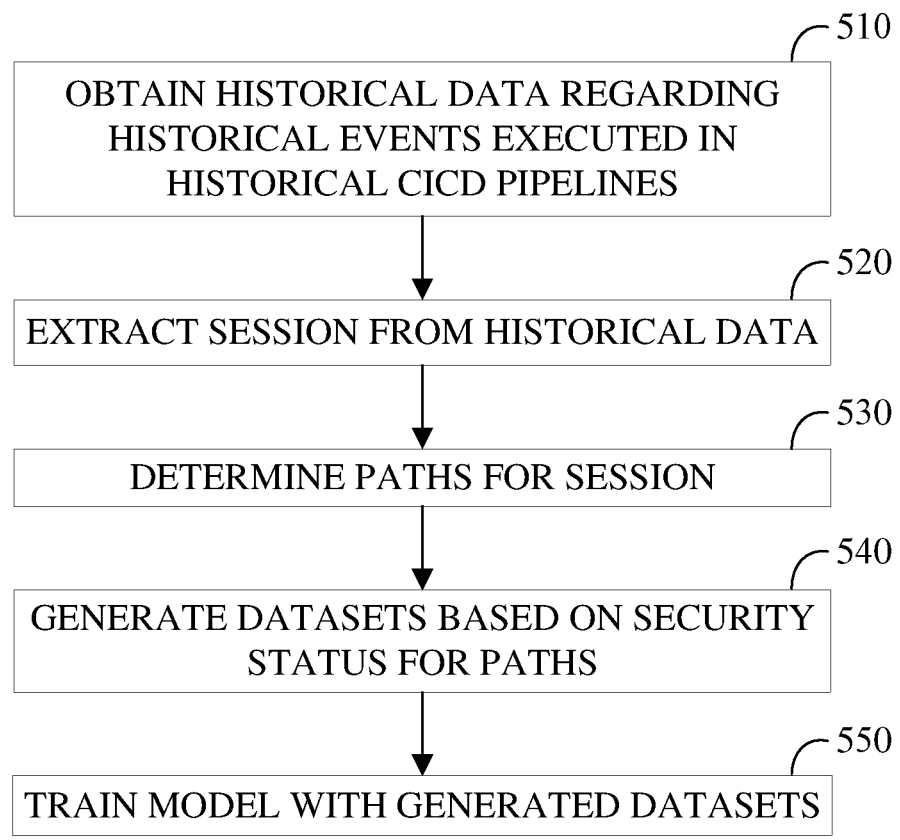
FIG. 5 depicts a schematic flowchart of a method for training a model according to an embodiment of the present disclosure.

FIG. 4 shows a schematic flowchart of an exemplary CICD pipeline 400. The CICD pipeline 400 includes a plurality of events that are connected and can be executed in a sequence. FIG. 5 shows a schematic flowchart of a method for training the model according to an embodiment of the present disclosure. The model can be configured to implement a security status prediction for a CICD pipeline. The embodiment will be described in detail below in conjunction with process in FIG. 4 and blocks in FIG. 5.

It can be noted that the processing for training the model according to embodiments of this disclosure could be implemented by a computing device, for example, the computer system/server 12 shown in FIG. 1.

At block 510, the computer device obtains historical data regarding a plurality of historical events executed in historical CICD pipelines. For example, the historical data can be stored in a database or distributed in separate storages.

In some embodiments, the historical data may include a great amount of log data. The log data can be automatically produced and time-stamped documentation of the plurality of events executed in the historical CICD pipelines. For example, the log data may indicate time stamps and/or executing results for the respective events, and the like. Moreover, the log data may also indicate developers' ID number and/or code version numbers related to the respective events.

The events may refer to tasks, activities, jobs, or steps executed in the CICD pipelines. For example, some exemplary events in a Continuous Integration (CI) process and a Continuous Deployment (CD) process of the CICD pipeline may be described below.

In the CI process, developers frequently commit codes to a main source, and ensure quality control through automated tests. As FIG. 4 shows, at block 401, a developer may commit/push codes to a code repository as the main source. The codes can be pulled from the code repository to initiate code builds. In some cases, code checking can be performed at block 405. Then, for example, smoke testing 407, compiling 409, image building 411, deploying 413, testing 415, and the like can be performed in a development and testing environment 410. The testing 415 may comprise, such as, unit tests, system integration tests, and regression tests. Generally, the CI process requires manual document review to determine whether it is in compliance with documentation requirements.

The CD process is an extension of the CI process. The CD process deploys the code frequently through an automated process. As Fig. 4 shows, deploying 417 and 423, quality assurance (QA) testing 419 and 425, releasing to a testing public cloud 421 and to a testing private cloud 427, and the like, can be performed in a production and testing environment 420. The CD process typically requires manual approval, for example, by flow managers, auditors.

In addition, there may be a pre-production process 430 after the CD process. In this process 430, compliance check and software runtime test need to be performed manually, for example, by scanners, monitors, checkers, auditors, or the like, to determine whether the deployments should be fully adopted in production or rolled back. Once the pre-production process is completed without problems, deployments can be performed to actual production environment.

For example, a resulting application or APP can thus be released to a client environment for use.

Further, as the CICD pipeline continues its process, when a new version of codes is pushed into the code repository, the above procedures can be repeated to generate an updated CICD pipeline.

It can be understood that the events in the CICD pipeline can be executed in different orders than the order presented above. Moreover, there may be additional events executed in the CICD pipeline, which are not limited herein.

At block 520, the computer device extracts at least one session from the historical data. Each session comprises a group of associated historical events.

In some embodiments, the log data from the historical data may hold a record of contextual information, such as, a timestamp, a user ID, a version number, a build number, and/or the like, relevant to each of the plurality of events. For example, the timestamp may indicate time information of the event being executed. The user ID may indicate the developer who executes the event. The version number may indicate a specific release of a software program, file, firmware, device driver, or hardware. The build number may indicate the recompilation number of the same source. Different build numbers might be assigned when the processor, platform, or compiler changes.

Moreover, the log data may also hold a record of an executing status of each of the plurality of events. For example, the executing status may indicate whether the event is executed successfully, failed with errors, passed with warnings, or jumpable to another event.

In some embodiments, the computer device may obtain contextual information of the respective historical events from the historical data. Then, the computer device may determine the at least one session based on the contextual information. Specifically, the associated historical events in each session have associated contextual information. For example, a plurality of events performed by a same user (i.e., with a same user ID) in a same day (based on the timestamp) may be determined as a session. In another example, a plurality of events with a same version number or build number may also be determined as a session. Moreover, the events may also be associated with each other in other manners, which may not be limited to the above examples.

To extracting the session, the computer device may employ various data processing techniques, such as, data extraction, data merging, data alignment, and the like. The data extraction is a process of retrieving data out of (usually unstructured or poorly structured) data sources for further data processing or data storage (data migration). The data merging is a process of merging different data into a main data file. The data alignment is a process of sorting the data based on the timestamps.

Figure 6:
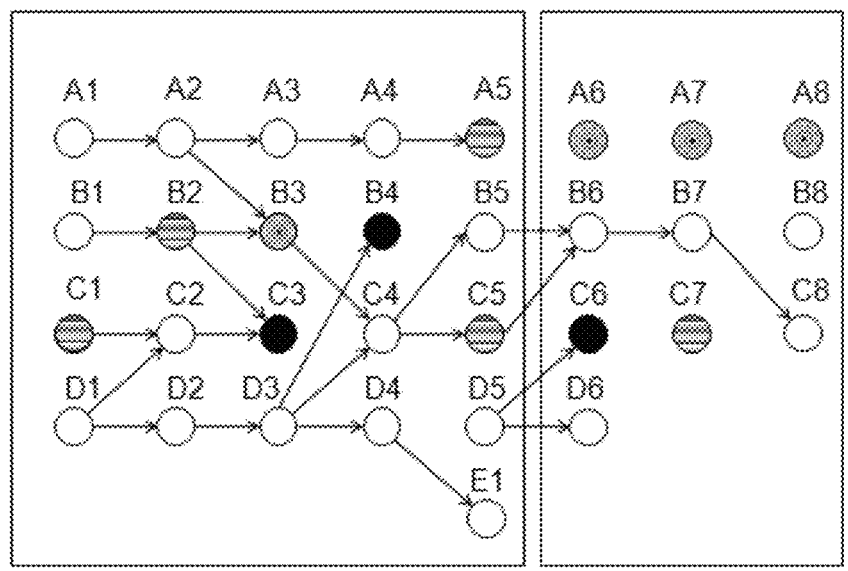
FIG. 6 depicts a schematic diagram of an exemplary session according to an embodiment of the present disclosure.

FIG. 6 shows a schematic diagram of an exemplary session according to an embodiment of the present disclosure. In FIG. 6, the session may include a plurality of events, which are indicated by a node, respectively. To distinguish the executing status of the events, the nodes are illustrated with different appearances.

As shown in FIG. 6, for example, blank nodes (such as, nodes A1, A2, A3, A4, Bl, B5, B6, B7, B8, C2, C4, C8, D1, D2, D3, D4, D5, D6, and E1) may indicate the events executed successfully. Solid nodes (such as nodes B4, C3, and C6) may indicate the failed events in a pipeline. The failure may be caused by some errors, such as, insufficient storages, network issues, code compiling errors, testing failed, or the like, when running the pipeline. Nodes with little circles (such as, nodes B3, A6, A7, and A8) may indicate the events that pass the execution with warnings such that the execution of the corresponding pipeline may not be effected to some extent. In addition, nodes with lines (such as, nodes A5, B2, C1, C5, and C7) may indicate jumpable condition. In this case, the corresponding events may not need to be executed, and jumpable to a next event directly.

In some embodiments, the display device may also visualize the session to make it more clear, intuitive and effective. For example, a visualization presentation of the session and related information may be displayed in a visual interface. It can be noted that the respective executing status can also be indicated in other manners, for example, with different colors.

In some embodiments, the computer device may analyze the historical log data to determine a failure reason with respect to the failed event. For example, the failure reason may include insufficient storages, network issues, code compiling errors, testing failed, or the like. In some other embodiments, the reason can also be analyzed manually by human operator, based on human experiences or adaptive tools. Therefore, the failure reason can be recorded in the log data for further use.

Reference back to FIG. 5, at block 530, the computer device determines a plurality of paths for each of the at least one session.

As the events are in some way related in the session, an event may lead to another event according to a triggering condition. As shown in FIG. 6, for clarity, the triggering relationship between two events can be indicated by a line with an arrow. For example, the event A2 is triggered to be performed after the event A1 is completed.

In some embodiments, some of the events can be connected to form a plurality of paths based on the relationship there between. Each of the paths comprises a sequence of a plurality of historical events. The plurality of paths may be classified into a plurality of first paths and a plurality of second paths. The first paths and the second paths are illustrated as below, as an example.

Figure 7:
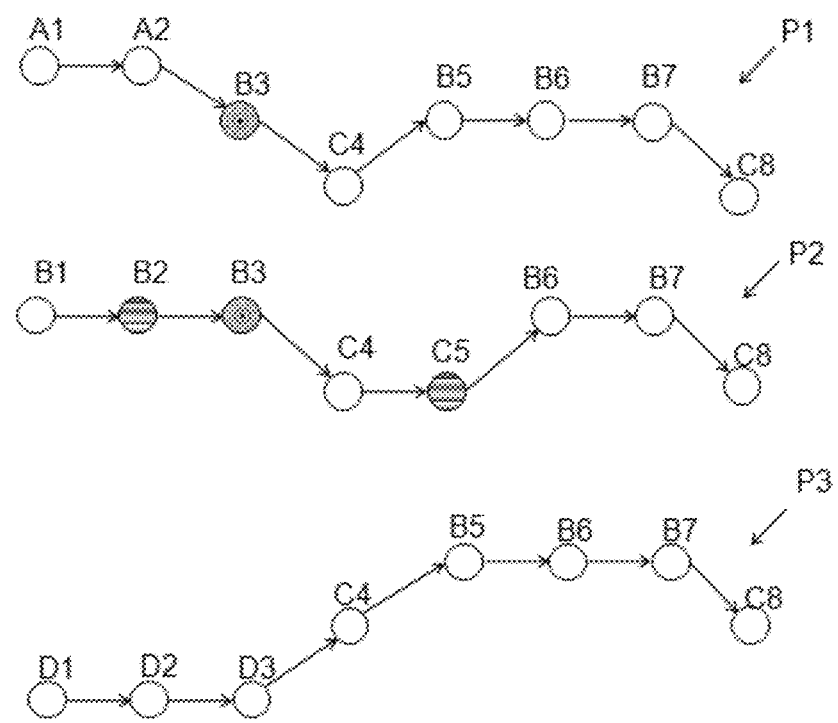
FIG. 7 depicts a schematic diagram of exemplary paths determined from the exemplary session shown in FIG. 6, according to an embodiment of the present disclosure.

The first path corresponds to a complete CICD pipeline and is able to be deployed to the pre-production environment. In some embodiments, the computer device may identify the first paths from the plurality of paths. FIG. 7 shows a schematic diagram of exemplary first paths determined for the session shown in FIG. 6, according to an embodiment of the present disclosure.

In FIG. 7, the computer device may identify path P1, path P2, and path P3 as the first paths. The path P1 is constituted by the nodes A1, A2, B3, C4, B5, B6, B7, and C8, which are connected in sequence. The path P2 is constituted by the nodes B1, B2, B3, C4, C5, B6, B7, and C8, which are connected in sequence. The path P3 is constituted by the nodes D1, D2, D3, C4, B5, B6, B7, and C8, which are connected in sequence. Therefore, these paths indicate the CICD pipelines which can be fully deployed to the pre-production environment.

It can be understood that, though the first path can be deployed in the pre-production environment, the computer device may still need to determine whether the first path is in compliance with certain rules so as to deploy to the actual production environment. For example, the rule may include, such as, The Health Insurance Portability and Accountability Act (HIPPA security rule), IT Corporate Security (ITCS300), The General Data Protection Regulation (GDPR), or the like.

On the other hand, the second path corresponds to a broken CICD pipeline, and is unable to be deployed to the pre-production environment. For example, the second path may be terminated due to a failure event. In some embodiments, the computer device may also identify the second paths from the plurality of paths. In FIG. 6, the computer device may determine a second path constituted by the nodes C1, C2 and C3, which is ended due to the failure event of the node C3. Moreover, the computer device may also obtain the failure reason for the node C3 from the log data.

In addition, the computer device may also identify isolated nodes in the session, such as A6, A7, A8, and C7, which may be caused by insufficient information. Thus, it is beneficial to obtain a huge amount of historical data, to realize more paths.

Then, back to FIG. 5, at block 540, the computer device generates a plurality of datasets based on a security status for each of the plurality of paths. For example, the security status may comprise an executing status and/or a compliance status.

Specifically, the executing status may indicate whether the path can be deployed to the pre-production environment. As described above, the identified first paths can be determined to be ready for deploying to the pre-production environment, while the identified second paths cannot be deployed. The computer device may obtain the executing status of the path from the history data, for example, the log data. Moreover, the computer device may determine the executing status of the path based on the executing status of the events in the path.

The compliance status may indicate whether the path is in compliance with a rule. If the first path is tested to be in compliance with the rule in the pre-production environment, it can be deployed to the actual production environment. If the first path is tested to be violated to the rule, it can be prevented from further processing. In some embodiments, the computer device may obtain the compliance status of the path from the history data, for example, the log data.

In some other embodiments, the computer device may obtain the compliance status for the respective first paths from a database. For example, the database may hold a record of first configuration information related to the historical CICD pipelines which are tested to be in compliance with a certain rule in the pre-production environment. Moreover, the first configuration information may further relate to the historical CICD pipelines which have been successfully deployed to the actual production environment, such that in compliance with a certain rule. As an example, the first configuration information may comprise the time stamp, the executing user ID, a code version number, a build number, or the like, associated with the historical CICD pipeline.

Then, the computer device may access the database to determine if the determined first path corresponds to the first configuration information, for example, based on the contextual information of the events in the first path. Therefore, in response to a correspondence between the first path and the first configuration information, the computer device may determine the first path is in compliance with the certain rule.

In an embodiment, the computer device may generate a first dataset based on the first paths compliant with a rule. The computer device may associate the first paths with a compliant pattern label for the rule. As an example, the first dataset may hold a list of historical release paths attached with a corresponding compliant pattern label. The historical release path may be generated based on semantic information of a historical path to indicate a release flow of the historical path. Any semantic analysis technique can be used herein.

For another aspect, the database may also hold a record of second configuration information related to the historical CICD pipelines which are tested to be violating to a certain rule in the pre-production environment. Moreover, the second configuration information may further relate to the historical CICD pipelines which are failed in deployment to the actual production environment due to violating to a certain rule. As an example, the second configuration information may comprise the time stamp, the executing user ID, a code version number, a build number, or the like, associated with the historical CICD pipeline.

Then, the computer device may access to the database to determine if the determined first path corresponds to the second configuration information, for example, based on the contextual information of the events in the first path. In response to a correspondence between the first path and the second configuration information, the computer device may determine the compliance status of the first path is not compliant with the certain rule.

In an embodiment, the computer device may generate a second dataset based on the first paths violating a rule. The computer device may associate the first paths with a violation pattern label for the rule. As an example, the second dataset may hold a list of historical release paths attached with a corresponding violation pattern label.

It can be noted that, a single first path may both in compliance with a rule and violating to another rule. Thus, the computer device may associate the single first path with a compliance label to a specific rule and a violation label to another specific rule.

Furthermore, the computer device may also generate a third dataset based on the second paths in the session. In an embodiment, the computer device may associate the second paths with a failure pattern label. For example, the third dataset may hold a list of historical release paths attached with a corresponding failure pattern label.

Therefore, the generated first dataset, second dataset, and third dataset can be configured to train the model as a classifier to predict a security status for a CICD pipeline.

As shown in FIG. 5, at block 550, the computer device trains the model with the generated datasets as training samples. The model can be a neural network, an artificial intelligence-based model, or the like.

In some embodiments, the training samples may include the first dataset and the second dataset. Further, the training samples may also include the third dataset. Moreover, the computer device may train the model by using feature extracting method and semantic analysis technique, to realize a semantic based pattern classifier. For example, the computer device may train the model based on semantic information. Therefore, the model can be trained with the historical release paths with compliance pattern label, the historical release paths with violation pattern label, and the historical release paths with failure pattern label. For example, historical release paths with a same label can be determined as a class. As the model is trained with more paths from the historical data, the model can be implemented to be more robust.

Based on the well-trained model, embodiments of the present disclosure may provide a method for implementing a security check of a CICD pipeline.

Figure 8:
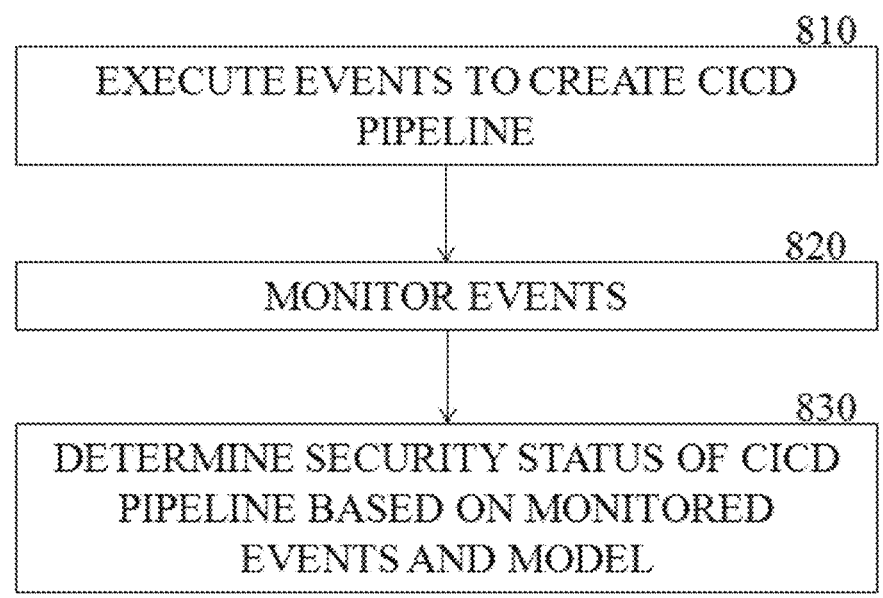
FIG. 8 depicts a schematic flowchart of a method for implementing a security check of a CICD pipeline according to embodiments of the present disclosure.

FIG. 8 shows a schematic flowchart of a method for implementing a security check of a CICD pipeline according to embodiments of the present disclosure. The embodiments will be described in detail below in conjunction with blocks in FIG. 8.

It can be noted that the processing of the security checking according to embodiments of this disclosure could be implemented by a computing device, for example, the computer system/server 12 shown in FIG. 1.

At block 810, the computer device executes a plurality of events sequentially to create a CICD pipeline. For example, the CICD pipeline may be a sequence of a plurality of events that can be executed.

For example, the events may include code checking, smoke testing, compiling, image building, deploying to stage, unit testing, system integration testing, regression testing, and the like, in a CI process. Moreover, the events may also include deploying, QA testing, releasing to testing private cloud or testing public cloud, and the like, in a CD process.

As the plurality of events can be executed sequentially, the computer device may create a gradually expanded path to form the CICD pipeline in a real time. That is, the computer device may create the CICD pipeline from a first event of the plurality of events to a last event of the plurality of events sequentially.

At block 820, the computer device monitors the plurality of events.

In some embodiments, the computer device may monitor each of the plurality of events during the corresponding event is executed. For example, the computer device may monitor the respective events to collect monitor data, such as contextual information, executing status, and the like associated with the events. Any adaptive monitors in the art can be used herein.

In addition, at block 830, the computer device determines the security status based on the monitored events and a model. The model can be trained according to the embodiments of the present disclosure. For example, the model can be trained with the method shown in FIG. 5.

In some embodiments, the computer device may provide current monitor data to the model in real time. The current monitor data may be associated with the corresponding event which has been executed.

Correspondingly, the model receives the monitor data continuously. The model may extract features from the received data and analyze the extracted features based on semantic technique. Therefore, as more monitor data being received, the model may generate a new release path gradually. Thus, the computer device may determine the security status of the CICD pipeline based on semantic information of the monitored events and the model.

Then, the model may compare the new release path with the historical release paths in the model, to determine a similarity score between the new release path and each of the historical release paths. When the model determines a similarity score being higher than a similarity threshold and/or being the highest among others, the model may determine the security status of the new release path based on the pattern label of the corresponding historical release path. For example, if the corresponding historical release path is attached with a compliance pattern label for a rule, the model may predict the new release path being compliance with the rule. If the corresponding historical release path is attached with a violation pattern label for a rule, the model may predict the new release path being violated to the rule. Moreover, if the corresponding historical release path is attached with a failure pattern label, the model may predict that the new release path will be fail in execution.

Then, the model may output the prediction result to the computer device. Therefore, the computer device may determine the security status of the CICD pipeline according to the prediction result from the model.

In some embodiments, the processes at block 810, 820, and 830 are performed approximately in parallel. For example, the computer device may create the first event of the current CICD pipeline while monitor the first event. Meanwhile, the computer device may transmit the monitor data of the first event to the model. Therefore, the model may immediately make the prediction based on the received monitor data and the historical release path and provide the prediction results to the computer device in a real time. The computer device may obtain updated prediction results for the current CICD pipeline from the model in sequential.

In a further embodiment, the computer device may determine whether to continue or terminate the creation process of the CICD pipeline based on the updated prediction results from model in a real time.

For example, if the prediction result indicates the high probability of the current CICD pipeline to be unsecure (for example, likely to be violated to a rule or failing in an execution process), the computer device may terminate the execution of the remaining events in advance.

Moreover, if the prediction result indicates the high probability of the current CICD pipeline to be secure (for example, likely to be in compliance with a rule), the computer device may repeat the above process to the remaining events of the CICD pipeline.

Moreover, the computer device may also train the model based on the determined security status of the CICD pipeline according to embodiments of the present disclosure.

Some examples illustrating the prediction process will be described below.

In a first example, the computer device executes a sequence of events to create a first CICD pipeline, monitors each event, and provides the monitor data to the model. The model generates a first new release path, as . . . ->Version A->Https with ingress->K8S, based on the received monitor data. Then, the model determines that a similarity score between the first new release path and a first historical release path, . . . ->Version A->Https with Tomcat->VM, is the highest and higher than the threshold. The model checks the pattern label of the first historical release path is a HIPPA compliance pattern label. Thus, the model may predict that the first new release path is in compliance with the HIPPA. Then, the computer device may receive the prediction result from the model, and determine the current created first CICD pipeline is in compliance with the HIPPA. Thus, the remaining events of the first CICD pipeline can be continually executed.

In a second example, the computer device executes a sequence of events to create a second CICD pipeline, monitors each event, and provides the monitor data to the model. The model generates a second new release path, as . . . ->log user ID with SIT->. . . ->Promote with True->Public Cloud, based on the received monitor data. Then, the model determines that a similarity score between the second new release path and a second historical release path, . . . ->log user ID with UT->. . . ->Promote with True->Private Cloud, is the highest and higher than the threshold. The model checks the pattern label of the second historical release path is a HIPPA violation pattern label. Thus, the model may predict that the second new release path is violated to the HIPPA. Then, the computer device may receive the prediction result from the model and determine the second CICD pipeline will be violated to the HIPPA eventually. Thus, the computer device can stop executing the remaining events of the second CICD pipeline to reduce consumption, thereby preventing the second CICD pipeline from deploying to an actual production in advance.

In a third example, the computer device executes a sequence of events to create a third CICD pipeline, monitors each event, and provides the monitor data to the model. The model generates a third new release path, as . . . ->Record user data with DB2->. . . ->Apply DB2 in Country A->Deploy in region of Country A->. . . , based on the received monitor data. Then, the model determines that a similarity score between the third new release path and a third historical release path, . . . ->Record user data with COS->. . . ->Apply COS in Country A->Deploy in region of Country A->. . . , is the highest and higher than the threshold. The model checks the pattern label of the third historical release path is a GDPR compliance pattern label. Thus, the model may predict that the third new release path is in compliance with the GDPR. Then, the computer device may receive the prediction result from the model and determine the current created third CICD pipeline is in compliance with the GDPR. Thus, the remaining events of the third CICD pipeline can be continually executed.

In a fourth example, the computer device executes a sequence of events to create a fourth CICD pipeline, monitors each event, and provides the monitor data to the model. The model generates a fourth new release path, as . . . ->Record user data with DB2->. . . ->Apply DB2 in Country B->Deploy in region of Country A->. . . , based on the received monitor data. Then, the model determines that a similarity score between the fourth new release path and a fourth historical release path, . . . ->Record user data with COS->. . . ->Apply COS in Country B->Deploy, is the highest and higher than the threshold. The model checks the pattern label of the first historical release path is a GDPR violation pattern label. Thus, the model may predict that the fourth new release path is violated to the GDPR. Then, the computer device may receive the prediction result from the model and determine the fourth CICD pipeline will be violated to the GDPR. Thus, the computer device can stop executing the remaining events of the fourth CICD pipeline and preventing the fourth CICD pipeline from deploying to an actual production in advance.

By avoiding executing the remaining events of the violated or failed CICD pipelines, time and computing resources can be efficiently saved. Moreover, a success rate of deployment can be improved.

Moreover, if the model determines that there is no historical access path which has a similarity score higher than the threshold to a created CICD pipeline, the computer device may deploy the created CICD pipeline in the pre-production environment to test if it can be deployed in the actual production environment.

Figure 9:
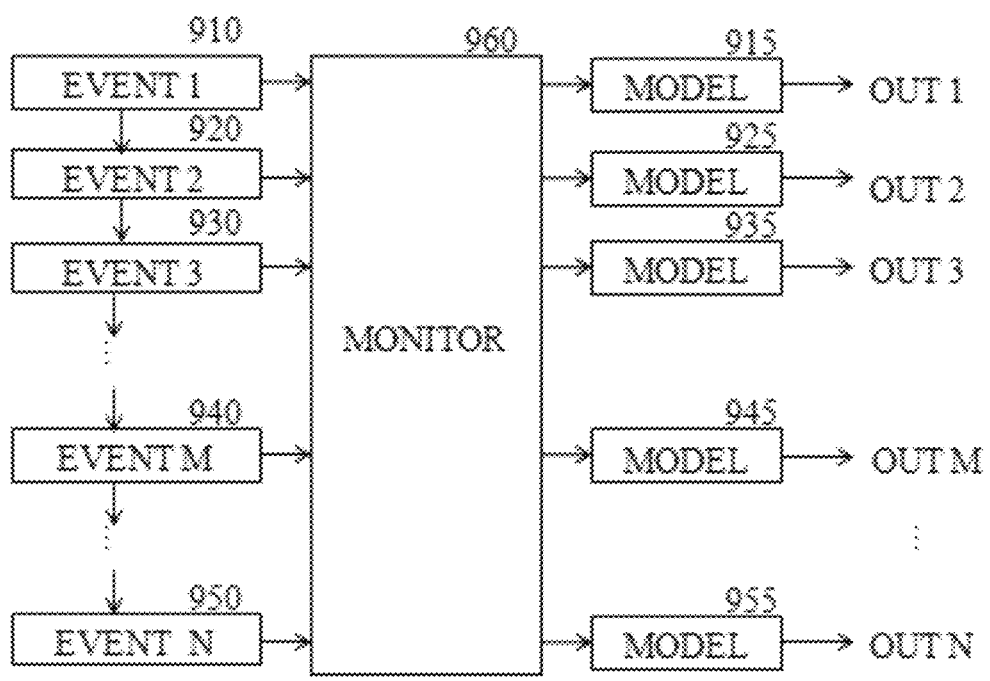
FIG. 9 depicts a schematic flowchart of an exemplary process of a security check of a CICD pipeline according to embodiments of the present disclosure.

FIG. 9 shows a schematic flowchart of an example illustrating a process of security check of a CICD pipeline according to an embodiment of the present disclosure. As shown in FIG. 9, the computer device may create the CICD pipeline by sequentially executing the respective events, such as, EVENT 1, EVENT2, . . . , EVENT M, . . . , and EVENT N.

For example, the computer device may execute the EVENT 1 of the CICD pipeline at block 910, while monitor the EVENT 1 at block 960, and provide the monitored information to the model at block 915. The model may immediately make prediction about the security status of the CICD pipeline based on the monitor data, and output the prediction result OUT 1 to the computer device. The computer device may receive the prediction result OUT 1. In some embodiments, there is a time delay between the EVENT 1 being executed and the prediction result OUT1 being received, but it would not be a significantly effect to reduce the efficiency of the method herein.

The computer device may execute the EVENT 2 of the CICD pipeline at block 920, while monitor the EVENT 2 at block 960, and provide the monitor data regarding the EVENT 2 to the model at block 925. The model then may immediately make prediction about the security status of the CICD pipeline based on the monitor data for the EVENT 1 and the EVENT 2, and output the prediction result OUT 2 to the computer device.

The computer device may execute the EVENT 3 of the CICD pipeline at block 930, while monitor the EVENT 3 at block 960, and provide the monitor data regarding the EVENT 3 to the model at block 935. The model then may immediately make prediction about the security status of the CICD pipeline based on the monitor data for the EVENT 1, the EVENT 2 and the EVENT 3, and output the prediction result OUT 3 to the computer device. As an example, the computer device may receive the prediction result OUT 3 after the EVENT M is executed.

If the prediction result OUT 3 indicates that the probability of the CICD pipeline violating to a rule is high, the computer device may determine to terminate the creation of the CICD pipeline. Therefore, the remaining events (from the EVENT M+1 to the EVENT N) can be prevented from being executed.

Otherwise, if the prediction result OUT 3 indicates that the probability of the CICD pipeline in compliance with a rule is high, the computer device may determine to continue the creation of the CICD pipeline. Therefore, the computer device may repeat the above processes to the remaining events. It can be understood that, above steps are only for illustrative, but in no way to limit the protection scope of the present disclosure. For example, some of the steps may not be performed, while some additional steps may also be involved.

The embodiments of the present disclosure may realize an early security check of the CICD pipeline. If the CICD pipeline is determined to be an unsecure pipeline during the creating process of the CICD pipeline, there is no need to run all of the related events in the CICD pipeline. According to embodiments of the present disclosure, the method for security check of the CICD pipeline improves the security of software deployment and the deployment rate. Moreover, the method may also reduce time costs and save computation resources.

Additionally, in some embodiments of the present disclosure, an apparatus for security check of a CICD pipeline can be provided. The apparatus may comprise one or more processing units, a memory coupled to at least one of the processing units, and a set of computer program instructions stored in the memory. The set of computer program instructions may be executed by at least one of the processing units to perform the above method.

In some other embodiments of the present disclosure, a computer program product for security check of a CICD pipeline can be provided. The computer program product may comprise a computer readable storage medium having program instructions embodied therewith. The program instructions executable by a processing unit causes the processing unit to perform the above method.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   executing, by one or more processing units, a plurality of events sequentially to create a Continues Integration and Continues Deployment (CICD) pipeline;
   monitoring, by one or more processing units, the plurality of events;
   comparing, by one or more processing units, a new release path of the CICD pipeline based on new monitor data, with a historical release path, to determine a similarity score between the new release path and the historical release path;
   in response to determining that the similarity score is higher than a predetermined threshold, determining a security status of the new release path, wherein the security status comprises an executing status regarding whether an event is executed successfully and/or a compliance status regarding adhering to predetermined rules;
   wherein determining, by one or more processing units, a security status of the new release path of the CICD pipeline is based on extracted features from the monitored events and an artificial intelligence model for predicting the security status of the CICD pipeline based on pattern labeling of executed events of the plurality of events; and
   in response to determining the security status indicates the CICD pipeline to be unsecure, terminating, by one or more processing units, execution of remaining events.

2. The computer-implemented method of claim 1, wherein determining the security status of the CICD pipeline based on the monitored events and the artificial intelligence model comprises:
   providing, by one or more processing units, current monitor data to the artificial intelligence model in real time, wherein the current monitor data is associated with a corresponding event of the plurality of events which has been executed; and
   determining, by one or more processing units, the security status of the CICD pipeline based on the current monitor data and the artificial intelligence model in real time.

3. The computer-implemented method of claim 1, wherein the artificial intelligence model is trained by:
   obtaining, by one or more processing units, historical data regarding a plurality of historical events executed in historical CICD pipelines;
   extracting, by one or more processing units, at least one session from the historical data, wherein each of the at least one session comprises a group of associated historical events;
   determining, by one or more processing units, a plurality of paths for each of the at least one session;
   generating, by one or more processing units, a plurality of datasets based on a security status for each of the plurality of paths; and
   training, by one or more processing units, the artificial intelligence model with the generated datasets.

4. The computer-implemented method of claim 3, wherein extracting the at least one session from the historical data comprises:
   extracting, by one or more processing units, the at least one session based on contextual information of the plurality of historical events from the historical data.

5. The computer-implemented method of claim 4, wherein the contextual information comprises at least one of: a timestamp, an executing user ID, a version number, and a build number.

6. The computer-implemented method of claim 4, wherein the plurality of paths comprises:
   at least one first path, each comprises a sequence of a plurality of historical events and is able to be deployed to a pre-production environment;
   wherein generating the plurality of datasets based on the security status for each of the plurality of paths comprises:
   determining, by one or more processing units, whether each of the at least one first path corresponds to first configuration information, wherein the first configuration information is associated with the historical CICD pipelines which are tested to be in compliance with a first rule; and
   generating, by one or more processing units, a first dataset based on the first path corresponding to the first configuration information, wherein training the artificial intelligence model with the generated datasets comprises training, by one or more processing units, the artificial intelligence model with the first dataset.

7. The computer-implemented method of claim 6, wherein generating the plurality of datasets based on the security status for each of the plurality of paths further comprises:
- determining, by one or more processing units, whether each of the at least one first path corresponds to a second configuration information, wherein the second configuration information is associated with the historical CICD pipelines which are tested to be not in compliance with the first rule; and
- generating, by one or more processing units, a second dataset based on the first path corresponding to the second configuration information, wherein training the artificial intelligence model with the generated datasets comprises training, by one or more processing units, the artificial intelligence model with the second dataset.

8. The computer-implemented method of claim 7, wherein the plurality of paths further comprises:
- at least one second path, each comprising a sequence of a plurality of historical events and is unable to be deployed to the pre-production environment, wherein generating the plurality of datasets based on the security status for each of the plurality of paths further comprises:
  - generating, by one or more processing units, a third dataset based on the at least one second path, and wherein training the artificial intelligence model with the generated datasets further comprises training, by one or more processing units, the artificial intelligence model with the third dataset.

9. The computer-implemented method of claim 8, wherein generating the plurality of datasets further comprises at least one of:
- associating, by one or more processing units, the first path related to the first dataset with a compliance pattern label;
- associating, by one or more processing units, the first path related to the second dataset with a violation pattern label; and
- associating, by one or more processing units, the second path related to the third dataset with a failure pattern label.

10. The computer-implemented method of claim 3, wherein training the artificial intelligence model with the generated datasets comprises:
- training, by one or more processing units, the artificial intelligence model based on semantic information of the historical CICD pipelines.

11. The computer-implemented method of claim 10, wherein determining the security status of the CICD pipeline based on the monitored events and the artificial intelligence model comprises:
- determining, by one or more processing units, the security status of the CICD pipeline, based on semantic information of the monitored events and the artificial intelligence model.

12. The computer-implemented method of claim 3, further comprising:
- training, by one or more processing units, the artificial intelligence model, based on the determined security status of the CICD pipeline.

13. A computer system, comprising:
- one or more computer processors;
- one or more computer readable storage media; and
- program instructions stored on the one or more computer readable storage media for execution by at least one of the one or more computer processors, the program instructions comprising:
  - program instructions to execute a plurality of events sequentially to create a Continues Integration and Continues Deployment (CICD) pipeline;
  - program instructions to monitor the plurality of events;
  - program instructions to compare a new release path of the CICD pipeline based on new monitor data, with a historical release path to determine a similarity score between the new release path and the historical release path;
  - program instructions to, in response to determining that the similarity score is higher than a predetermined threshold, determine a security status of the new release path, wherein the security status comprises an executing status regarding whether an event is executed successfully and/or a compliance status regarding adhering to predetermined rules;
  - wherein determining a security status of the new release path of the CICD pipeline is based on extracted features from the monitored events and an artificial intelligence model for predicting the security status of the CICD pipeline based on pattern labeling of executed events of the plurality of events; and
  - program instructions to, in response to determining the security status indicates the CICD pipeline to be unsecure, terminate execution of remaining events.

14. The computer system according to claim 13, wherein the program instructions to determine the security status of the CICD pipeline based on the monitored events comprise:
- program instructions to provide current monitor data to the artificial intelligence model in real time, wherein the current monitor data is associated with a corresponding event of the plurality of events which has been executed; and
- program instructions to determine the security status of the CICD pipeline based on the current monitor data and the artificial intelligence model in real time.

15. The computer system according to claim 13, wherein the program instructions to train the artificial intelligence model comprise:
- program instructions to obtain historical data regarding a plurality of historical events executed in historical CICD pipelines;
- program instructions to extract at least one session from the historical data, wherein each of the at least one session comprises a group of associated historical events;
- program instructions to determine a plurality of paths for each of the at least one session;
- program instructions to generate a plurality of datasets based on a security status for each of the plurality of paths; and
- program instructions to train the artificial intelligence model with the generated datasets.

16. The computer system according to claim 15, wherein the program instructions to extract the at least one session from the historical data comprise:
- program instructions to extract the at least one session based on contextual information of the plurality of historical events from the historical data.

17. The computer system according to claim 15, wherein the program instructions to train the artificial intelligence model comprise:

program instructions to train the artificial intelligence model based on semantic information of the historical CICD pipelines.

18. A computer program product comprising:
one or more computer readable storage media and program instructions stored on the one or more computer readable storage media, the program instructions comprising:
program instructions to execute a plurality of events sequentially to create a Continues Integration and Continues Deployment (CICD) pipeline;
program instructions to monitor the plurality of events;
program instructions to compare a new release path of the CICD pipeline based on new monitor data, with a historical release path to determine a similarity score between the new release path and the historical release path, wherein the security status comprises an executing status regarding whether an event is executed successfully and/or a compliance status regarding adhering to predetermined rules;
program instructions to, in response to determining that the similarity score is higher than a predetermined threshold, determine a security status of the new release path;
wherein determining a security status of the new release path of the CICD pipeline is based on extracted features from the monitored events and an artificial intelligence model for predicting the security status of the CICD pipeline based on pattern labeling of executed events of the plurality of events; and
program instructions to, in response to determining the security status indicates the CICD pipeline to be unsecure, terminate execution of remaining events.

* * * * *